Dec. 20, 1966     L A. CROSS, JR     3,292,631
DATA PROCESSING EQUIPMENT
Filed April 11, 1963     10 Sheets-Sheet 1
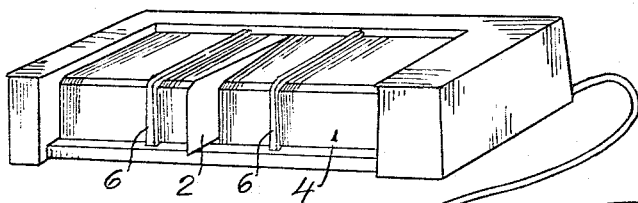
Fig. 1.
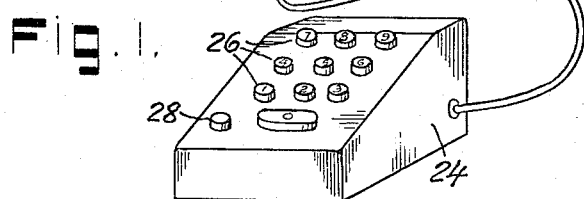
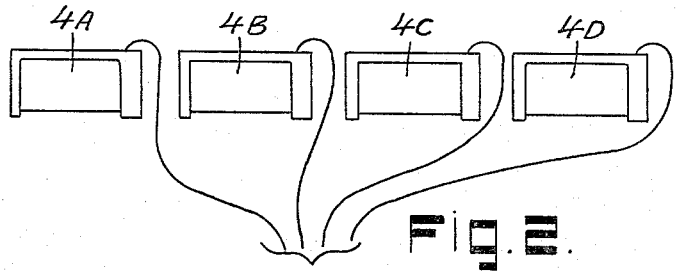
Fig. 2.
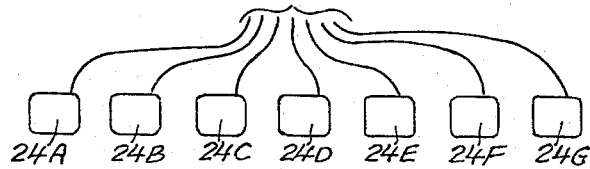
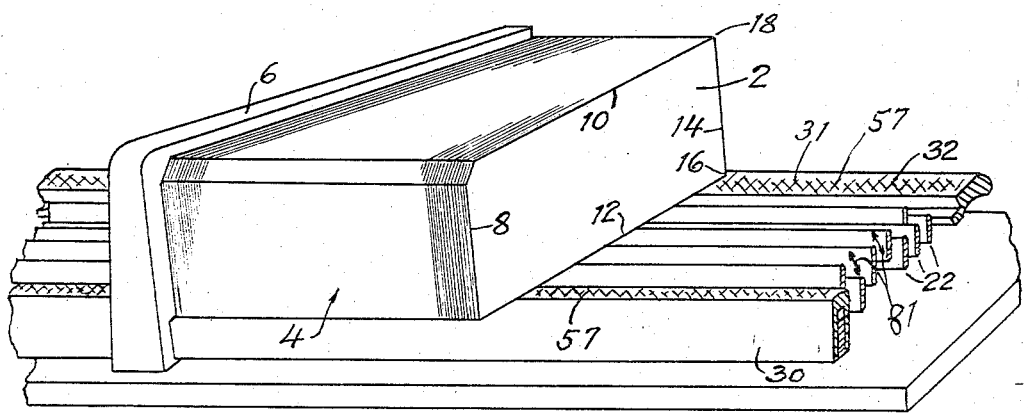
Fig. 3.
INVENTOR.
L ALLAN CROSS, JR.
BY *Albert Sperry*
ATTORNEY

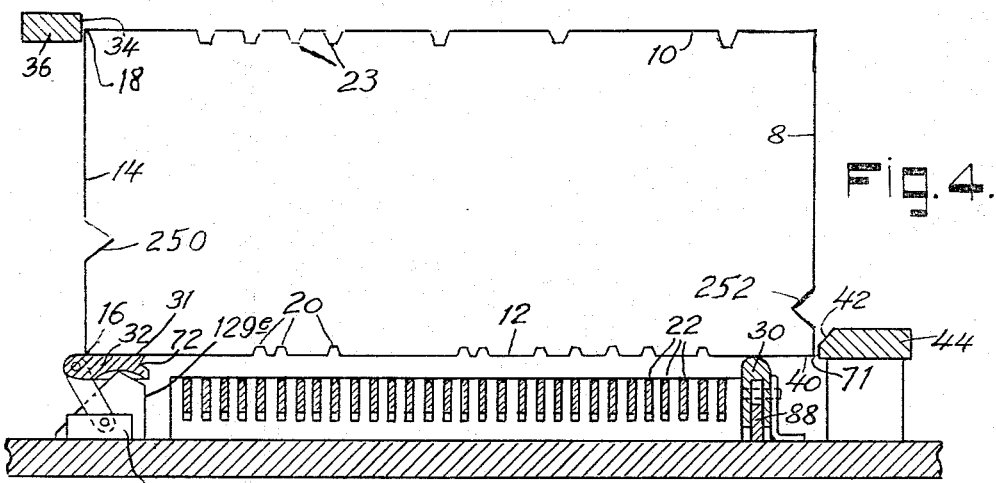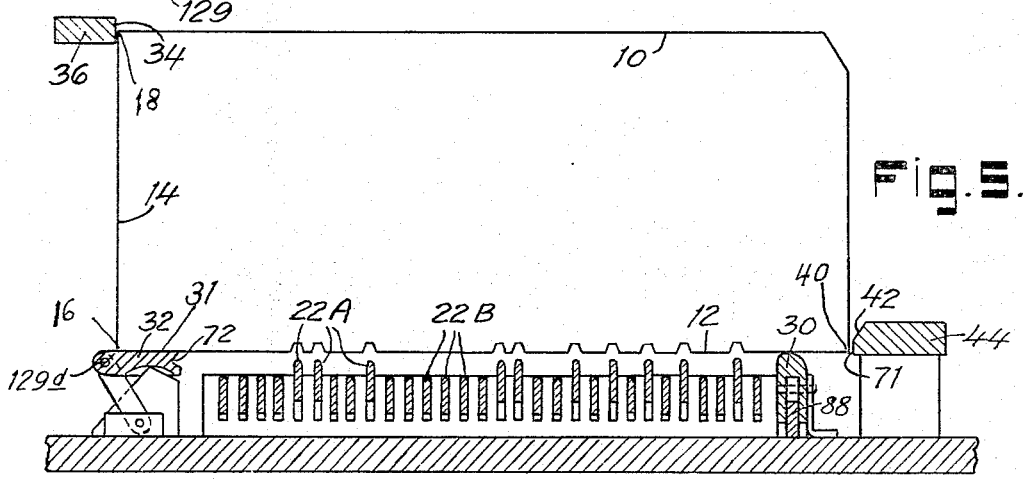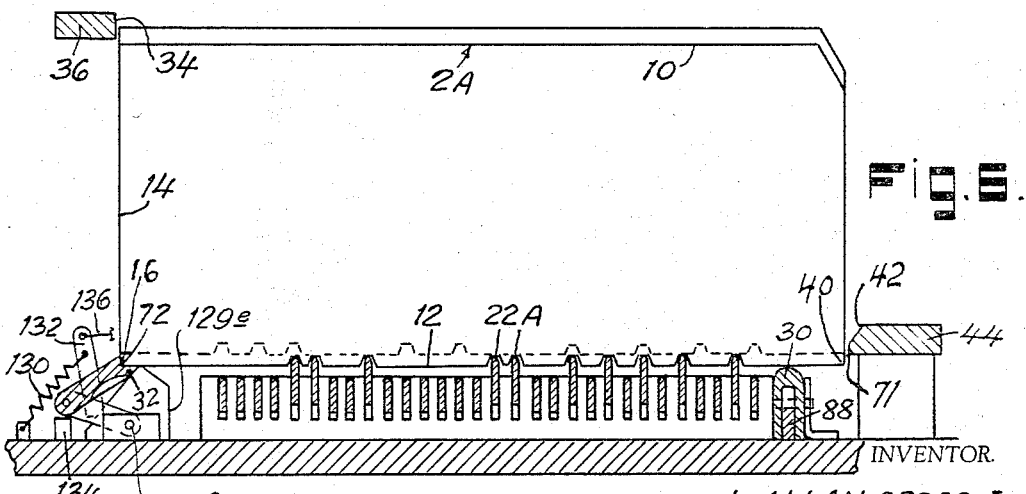

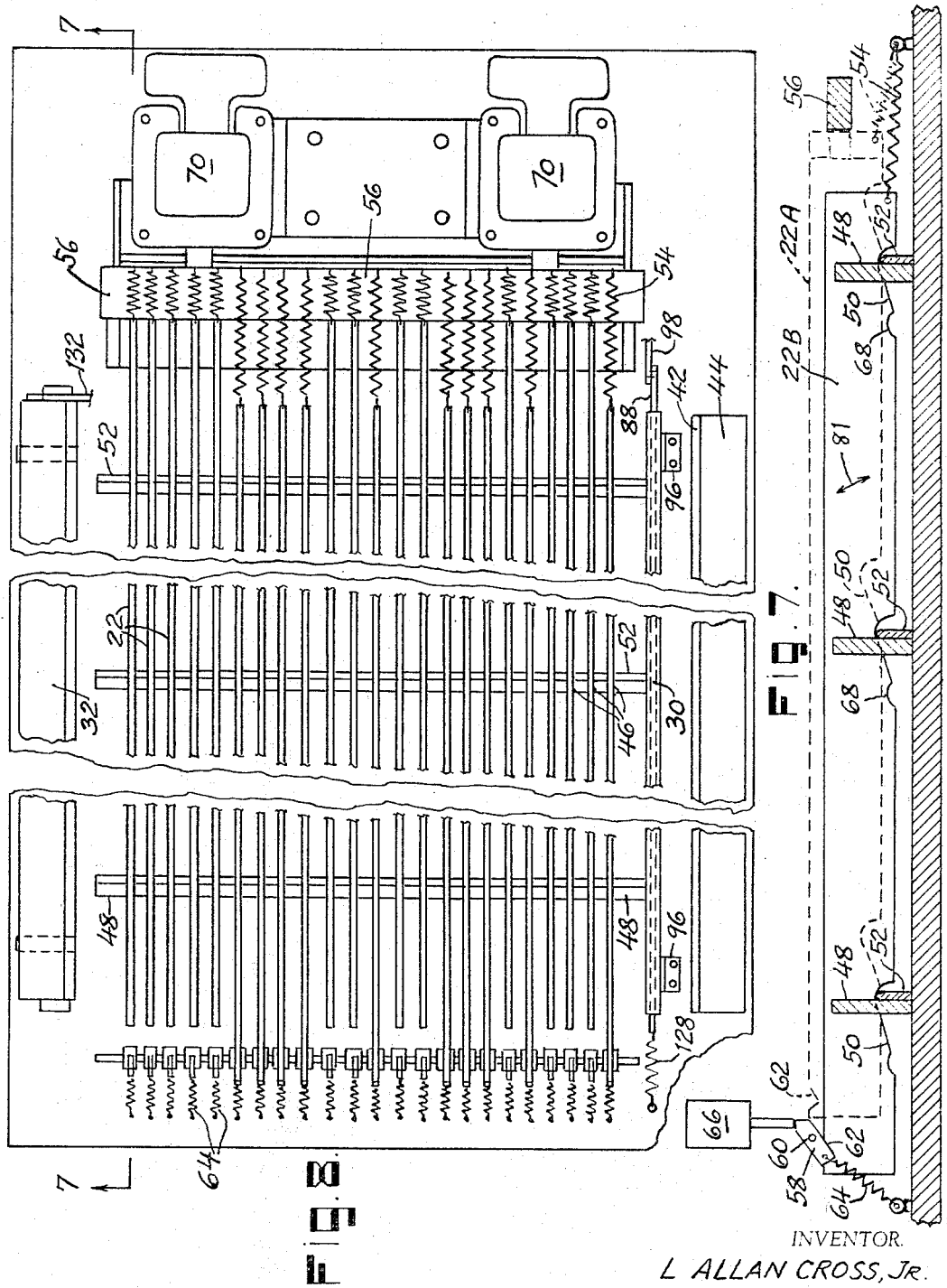

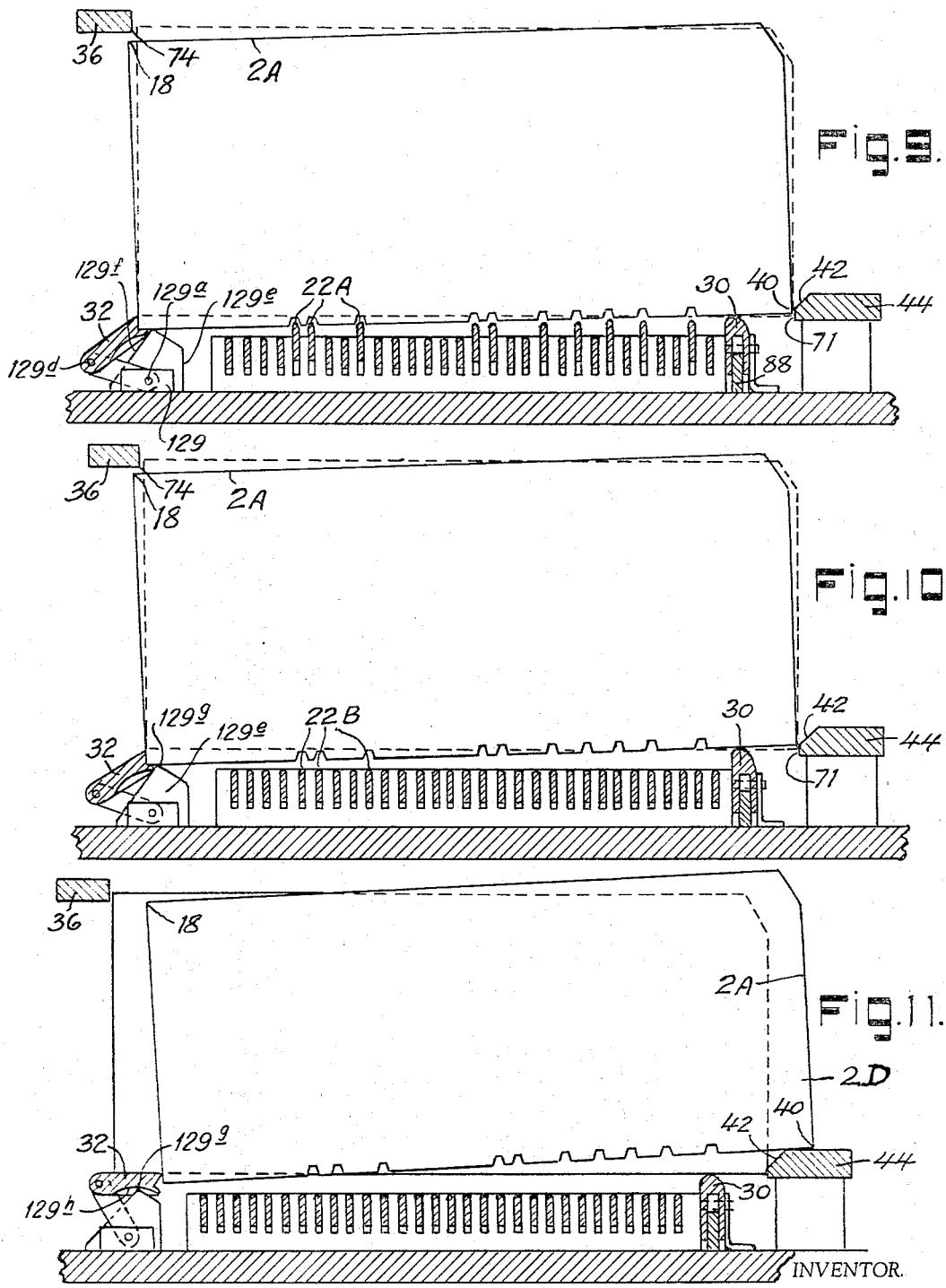

Dec. 20, 1966  L. A. CROSS, JR  3,292,631
DATA PROCESSING EQUIPMENT
Filed April 11, 1963  10 Sheets-Sheet 5

INVENTOR.
L ALLAN CROSS, JR.
BY Albert Sperry
ATTORNEY

Dec. 20, 1966    L. A. CROSS, JR    3,292,631
DATA PROCESSING EQUIPMENT
Filed April 11, 1963

INVENTOR.
L ALLAN CROSS, JR.
BY Albert Sperry
ATTORNEY

Dec. 20, 1966          L. A. CROSS, JR          3,292,631
                     DATA PROCESSING EQUIPMENT
Filed April 11, 1963                        10 Sheets-Sheet 7

INVENTOR.
L ALLAN CROSS, JR.
BY  Albert Sperry
         ATTORNEY

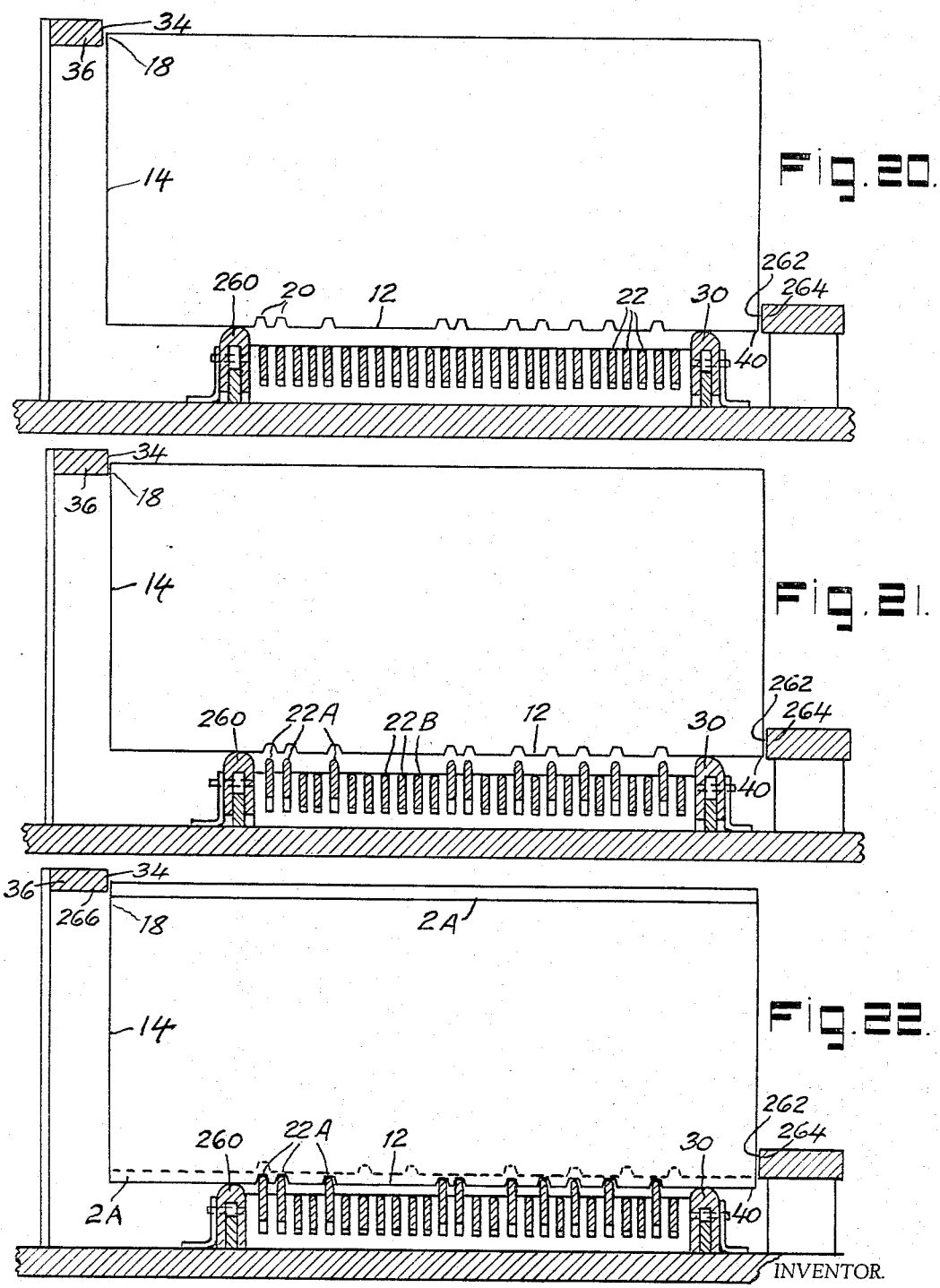

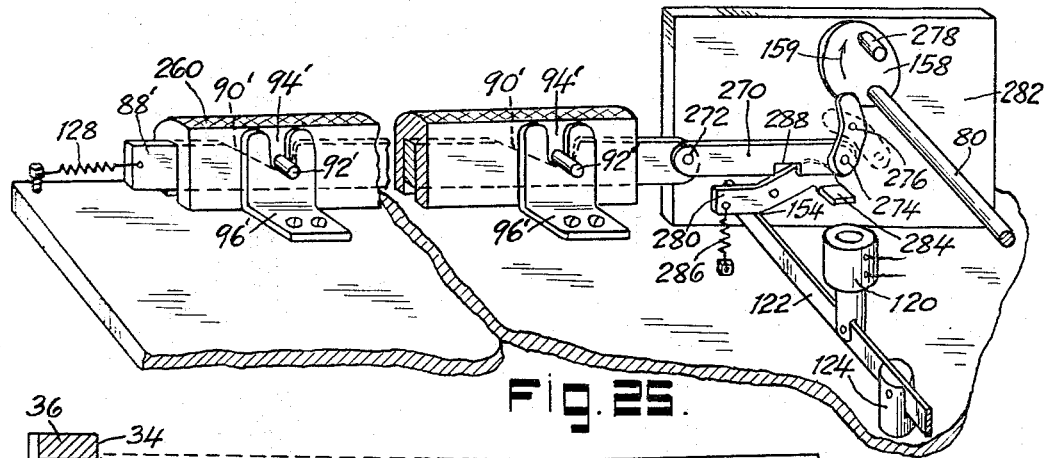
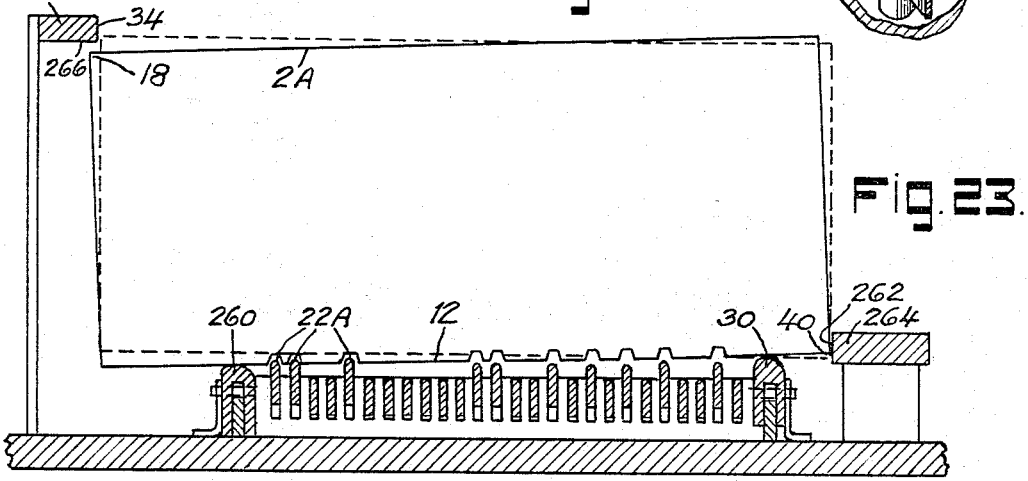
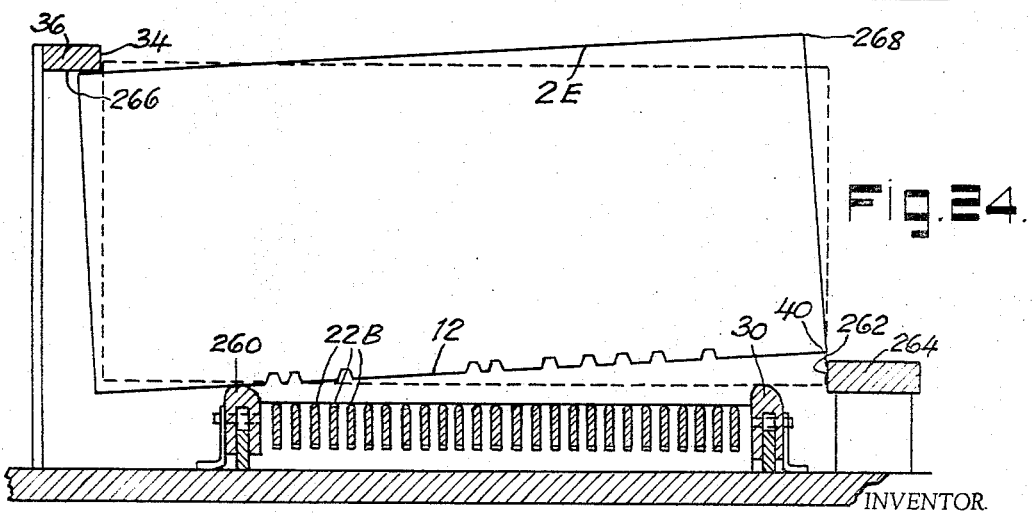

United States Patent Office

3,292,631
Patented Dec. 20, 1966

3,292,631
DATA PROCESSING EQUIPMENT
L Allan Cross, Jr., Lambertville, N.J., assignor, by mesne assignments, to Randomatic Data Systems, Inc., Trenton, N.J., a corporation of New Jersey
Filed Apr. 11, 1963, Ser. No. 272,485
9 Claims. (Cl. 129—16.1)

This invention relates to data processing equipment for the automatic selection, sorting and use of "cards" or other information-containing elements, and is directed particularly to equipment whereby desired information may be easily and quickly processed while using a plurality of random or orderly arranged "cards" or similar elements contained in a file of such information.

Card-sorting and selecting equipment has been widely used heretofore for the purpose of selecting a specific card or group of cards containing desired information. However, such equipment has frequently required the use of special types of cards and special types of selecting equipment with the result that cards designed for use in one system cannot be used in other types of card selecting equipment. Thus, in some prior systems, each card is provided with a metallic or armature affecting element which renders it difficult if not impossible to utilize such cards in other business machines or data processing equipment. Other systems serve to move a selected card to a conspicuous position but do not permit the automatic removal of such a card from the file. Moreover, in some instances, the manner in which the cards are coded or otherwise designed for selection has been such that repeated sorting or selecting operations have been required in order to obtain any specific card or detailed information.

Another limiting characteristic of prior data-processing equipment has been due to the unitary nature thereof whereby each card-selecting device has been controlled by its own individual keyboard or signal input means.

In accordance with the present invention, novel types of data processing equipment are provided whereby the "cards" or information-carrying elements may be of various types including punched, typed or marked cards, cards consisting of or embodying transparent material or microfilms, and cards which may consist of or contain magnetic, conducting or other types of information-storing or imparting means. Such cards may be formed of or embody cardboard, plastic, metal, or any other desired material capable of retaining its shape or form within a file of cards. Furthermore, the coding of the card does not interfere with the further handling of the card in other or conventional processing equipment such as punched card tabulating equipment. As a result, the cards even though previously coded for selection may be used in other types of equipment and may if desired be removed from the file and have additional data or information impressed thereon or applied thereto before the card is returned to the file.

The cards utilized in the practice of the present invention are also characterized by the presence of one or more code-receiving or carrying portions which may extend the full length of either the lower or the upper edge of the card. In fact, one edge of the card may be coded in accordance with one coding system and the other edge may be coded in accordance with a different coding system or in greater detail than the opposite edge of the card. Thus, for example, notches, recesses, or other coding elements may be arranged in selected and predetermined spaced relation corresponding to one or a great number of identifying or informational characteristics of the cards. It is, therefore, possible to employ a relatively complex code or to employ a plurality of different codes or signals emanating from the same or different sources to actuate one or a plurality of card-selecting devices from a single source or various sources in making a selection of any card or group of cards in the retrieval of stored information.

Further, in accordance with the present invention, the card or cards selected by the coded signals or impulses may thereafter be moved with respect to the file or be completely removed from the file or be otherwise handled in a manner to permit the utilization of the information carried by the card or the addition of information thereto. Thus, the selected card in a random file may be projected from the file for removal and manular or automatic handling thereof. In the alternative, a card in an orderly arranged file may be moved to permit disclosure of its information without complete removal from the file after which the card may be returned to its original place in the file to maintain the orderly arrangement of the cards therein.

Accordingly, the principal objects of the present invention are to provide novel methods and means for the retrieval of information from a file or files of cards or other information-carrying elements, to move or handle any card or cards selected so as to permit ready use of the information carried thereby, to select information as required from either a random or orderly arrangement of cards, and to effect the selection and utilization of information in card files with greater ease, versatility, and particularity than has been possible heretofore.

It is a specific object of this invention to automatically select a card at random from a file of cards which may be of any practical size or shape and made of any practical material. For this purpose, any selected card or cards may be moved in one direction so as to be offset from non-selected cards and rendered available for free access and for movement of the selected cards in another direction by manual or automatic means to permit utilization of the selected cards.

Another specific object of this invention is to use data processing cards as designed for other business machines and to effect the selection of any particular card from a file whereby equipment embodying the present invention can be used in conjunction with existing or other business or data processing equipment.

A further specific object of the invention is to utilize variable means for supplying card selecting signals, such as electrical impulses, for example, to the file so that input signals from one or various sources may be employed to actuate one or a plurality of file units. The arrangement thus provided permits the equipment to be constructed on a modular system of design irrespective of the physical location of the file units or other elements of the construction.

It is a specific object of this invention to minimize the code structure requirements within a card to be selected from the file by notching one edge of each card in accordance with a specific code while omitting notches at all other unused portions within the card. At the same time, if desired, the opposite edge of the card may also be provided with selected notches corresponding to the same or a different coding system to afford greater particularity in the selection of cards and the use of the system.

These and other objects and features of the present invention will appear from the following description thereof wherein reference is made to the figures of the accompanying drawings.

In the drawings:

FIG. 1 is a perspective illustrating a typical form of equipment embodying the present invention;

FIG. 2 is a diagrammatic illustration of a system in which the equipment of FIG. 1 may be employed;

FIG. 3 is an enlarged view in perspective illustrating a portion of the equipment shown in FIG. 1;

FIGS. 4, 5 and 6 are transverse sectional views through the equipment illustrated in FIG. 1 showing typical card-selecting members and the information-carrying cards or elements in alternative relative positions which they may assume during the operation of selecting a card or cards;

FIG. 7 is a longitudinal sectional view of the equipment illustrated in FIGS. 1 and 3 to 6 substantially on line 7—7 of FIG. 8, the scale being slightly enlarged above that of FIGS. 4–6, portions being broken away, a card-selecting member being shown in full lines in normal, rest position and in dotted lines in a moved, selecting position;

FIG. 8 is a top plan view on the same scale as FIGS. 4–6 of the card-selecting members of FIGS. 4 to 7 and actuating means therefor;

FIGS. 9, 10 and 11 are sectional views of the equipment similar to FIGS. 4, 5 and 6, but illustrating typical positions and movements of cards and mechanism for presenting selected cards for removal or use;

FIGS. 20 and 24 illustrate an alternative embodiment of the present invention wherein the cards are selected and then moved upward for removal from the file; and FIG. 25 illustrates a modification of the elements shown in FIG. 12 which may be used when the cards are to be moved as shown in FIGS. 20 to 24.

Figure 12:
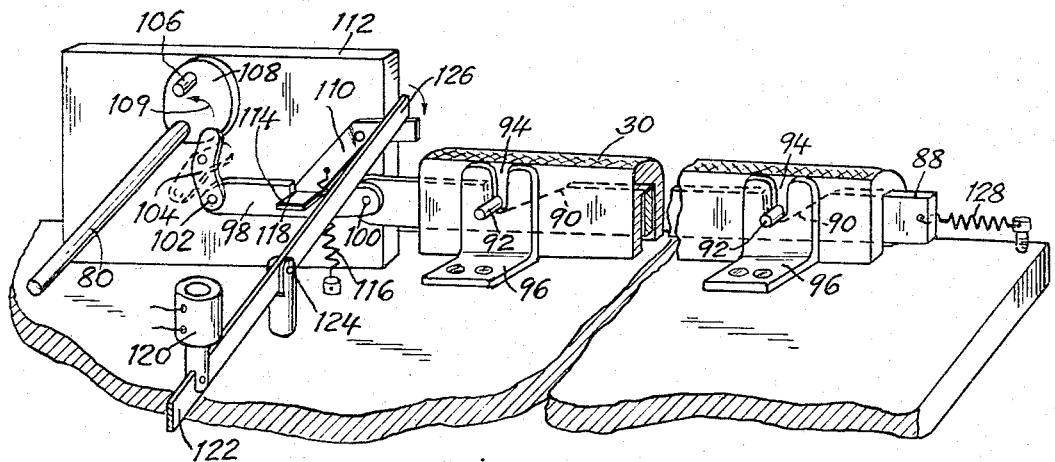
FIG. 12 is a fragmentary perspective view illustrating a portion of typical mechanism which may be employed in selecting and moving cards in accordance with the present invention.

In that form of the invention chosen for purposes of illustration in FIGS. 1 to 16 of the drawings, the cards or other information-carrying elements are indicated at 2 and are arranged side by side in a file 4 which, if desired, may be separated into sections by means such as the dividers 6 which hold the cards in a substantially vertical or erect position within the file. The dividers 6 may be movable longitudinally with respect to the file, if desired, and they may, if desired, be used to separate the cards into numerical groups, informational groups, or into groups of cards of different physical types, such as cardboard, plastic, microfilm, metallic or magnetic types. The dividers preferably are employed in all files wherein the number of cards is variable so that either a large or a lesser number of cards are present between the dividers whereby the cards may be prevented from falling sideways or being otherwise displaced so as to prevent or reduce the accuracy of any card-selecting means employed. The dividers 6 may, of course, be used in files wherein the cards are arranged in either consecutive or random order, as desired.

The cards 2, as shown, are preferably of a generally rectangular shape and of substantially the same size. The upper edges 10 and the lower edges 12 of all of the cards in the file are preferably located at approximately the same level within the file whereas the rear vertical edge 14 as well as the lower rear corners 16 and upper rear corners 18 of the cards should be similarly positioned within the file in order to assure the desired selection and movement of the cards in accordance with the present invention.

As further shown in FIGS. 4, 5 and 6, the lower edge 12 of each card is provided with one or a plurality of code elements arranged in spaced relation along said edge. Such code elements as here shown are notches, recesses, indentations or other configurations 20 which may be suitably formed and arranged to distinguish each card or each of a number of cards from other cards in the file. The notches 20 can be spaced and arranged in accordance with any desired code, classification, or system, such as a numbering system, a class of information, or any other code desired. A typical code which has been used in producing and spacing the indentations 20 in the lower edges of cards is a suitable binary system, which may use two of any of five channels, impulses or codification means to express or designate any digit from 0 to 9. Such notches or other code characters can be positioned in predetermined positions and spaced relation throughout substantially the entire length of the lower edge 12 of the card, and if desired, additional or differently coded elements 23 may be located in the upper edge 10 of the card. In this way, the number of identifying elements of a coded signal or means for selecting a card from the file 4 can be relatively large and data or information of a detailed character can ordinarily be obtained without resorting of cards in order to obtain specific information. Nevertheless, if desired, the cards can be inverted in the file for more specific selection or for selection in accordance with a different coding system as shown in FIG. 4.

In order to select a particular card or cards from the file of cards 4, the mechanism illustrated in the drawings is provided with a plurality of selector bars 22 which extend lengthwise of the file beneath the cards and transversely with respect to the lower edges thereof. Any suitable or preferred number of the selector bars 22 may be provided and it is possible and generally desirable to provide as many selector bars as there are spaces for notches in the lower edges of the cards. Thus, if the card is designed for use with a binary numerical code wherein the numbers from 0 to 9 can be expressed by selected positioning of two notches 20 in each of five alternative positions, it will be possible to select any individual card numbered from 0 to 999,999, while employing the code notches on one edge only of the card by using thirty selector bars 22 (corresponding to six sets of five channel binary signal responsive bars). If desired, the selected cards can then be inverted to utilize a code system on the opposite edge of the card whereby the cards can be selected with the greatest particularity. In order to indicate which edge of the cards 2 and which code of the cards is being used, the vertical ends 8 and 14 of the cards may be differently notched or formed as shown at 250 and 252 in FIG. 4. However, when only the horizontal edge 10 of the cards is coded, the one corner of each card may be cut off as shown in FIGS. 5 and 6 to indicate inversion of any card in the file.

The code-expressing means used to select and actuate the selecting bars 22 of the equipment may be of any suitable or preferred type and, as shown in FIG. 1, a device 24 having keys 26 and a clearing or correction key 28 which operates to prepare the device 24 for renewed or corrected operations may be employed. Ordinarily, it is preferred to arrange the elements of the impulse or signal responsive means so that the final impulse or signal of a series—such as six numbers—will serve to initiate a cycle of operation. In this way, if an error in the signal or number impressed on the system should be made, the entire number or preceding series of signals can be corrected or cleared by operation of the correction key 28 before proceeding further in the cycle of operations.

Further, as illustrated diagrammatically in FIG. 2, the equipment of the present invention may be employed to select a particular card from any one of a plurality of files 4A, 4B, 4C, and 4D, or to select similar cards simultaneously from each or any of said files. Moreover, as shown in FIG. 2, the signals utilized in actuating the selecting means may be derived from any one or more of a large number of signal-transmitting means indicated at 24A to 24G. It should be noted that signal-transmitting means 24A to 24G indicates any device or devices capable of supplying electrical or mechanical input signals to actuate the file units, not necessarily the keyboard 24 as shown in FIG. 1.

Equipment embodying the present invention when thus organized provides a system having the utmost flexibility and a capacity for control and selection of data-carrying cards from a vast file or storehouse of information. The files 4A to 4D may be located in the same or in distant rooms, libraries or even remote cities, if desired; whereas, the signal devices 24A to 24G may be similarly located at adjacent or remote points as required for any particular purpose. Thus, by way of example, a particular book or publication which may be stored in any one of a number of branch libraries in a city can be located by an operator in any other branch library or even a remote city, if desired; and the party seeking the book can be notified of its location.

In order to effect the desired selection of a particular card or cards from an orderly or random file of cards, the cards in the file 4 are placed in upright positions upon a vertically movable front support member 30 and a rear sweeper member 32. The front support member is movable vertically whereas the rear sweeper member 32 is movable from the horizontal card supporting position shown in FIGS. 4 and 5 to a retracted selected card receiving position as shown in FIG. 6.

When the cards 2 are placed in the file, they initially rest upon the front support 30 and the upwardly facing surface 31 of the rear sweep 32 as shown in FIG. 4. The lower edges 12 of the cards then extend horizontally in the file 4 and are spaced a short distance above the selector bars 22. The vertical rear edges 14 of the cards in the file 4 are then positioned in substantial alignment with each other and the upper rear corners 18 of the cards engage or are positioned adjacent the front surface 34 of a card-engaging bar 36 located at the rear and above the file. The lower front corners 40 of the cards 2 in the file 4 are also positioned in alignment with each other and adjacent the vertical face 71 of the front card-retaining bar 44 below the inwardly inclined surface 42 of a front card-retaining bar. This will be the normal position of all the cards in the file when the equipment is at rest.

When it is desired to select a particular card or cards from the file 4, at least one, and generally several, of the selecting bars 22 are raised from the lowered idle position of FIG. 4 to the raised selecting position of FIG. 5 wherein code or signal selected bars 22A project above the lowered and idle selecting bars 22B, but still are beneath and preferably spaced from the lower edges 12 in the file 4.

Such actuating, raising, or other selecting movement of the selecting bars 22 can be effected by any suitable means and in response to any desired signal or impulse. As shown in FIGS. 7 and 8, the bars 22 may be caused to rise by being moved longitudinally within vertical slots 46 in a transverse bracing member 48. The selector bars 22 are thus held in vertical positions, but when moved longitudinally, the bars 22A are raised by engagement of the inclined surfaces 50 on the lower edges of the selector bars with the stationary transverse cam plates 52 mounted on the bracing members 48.

As seen in FIG. 7, each of the selector bars 22 is urged to the right by a spring 54 toward a position in which the ends of the selector bars engage the actuating bar 56. However, the selector bars 22 are ordinarily held against such longitudinal movement by latch means 58 pivotally mounted at 60 and engageable with a notch 62 in the bar 22 near the left-hand ends of the selector bar as seen in FIG. 7. A spring 64 urges the latch means 58 into engagement with the notch 62, but the latch means is movable against the action of spring 64 when actuating means such as the solenoid 66 is energized. The actuating means by which the latch 58 is actuated may, of course, be either mechanical or electrical and is herein referred to as a solenoid by way of example. Accordingly, each time a signal or a suitable mechanical or electrical impulse is received from one of the keys 26 or the like of the actuating device 24 or from any other source such as the devices 24A to 24G, one or more of the actuating means or solenoids 66 will be energized to release a predetermined selector bar 22 for longitudinal movement under the action of spring 54. When so released, the longitudinal movement of the selector bar 22 causes the inclined surface 50 on the lower edge of the bar to ride up on the cam plate 52 at the lower edge of the slot 46 on the bracing member 48. When the selector bar is so moved, it is raised from the lowered idle position 22 to a position in which its upper edge is raised above the upper edges of adjacent idle selector bars 22B so as to assume the raised position as shown at 22A in FIGS. 5 and 6. Moreover, when so moved, the inclined surfaces 50 on the selector bars 22 pass beyond the ends of said surfaces so as to bring the retaining notches 68 at the ends of inclined surfaces 50 in engagement with the cam plates 52. The selector bars 22 then are held in the raised positions 22A and the right-hand ends of the raised seelctor bars 22A will be urged against the actuating bar 56 by springs 54 as shown in FIGS. 7 and 8. The relative positions of the selector bars 22A and 22B and the cards 2 in the file 4 are then substantially as shown in FIG. 5.

When all of the coded signals or other impulses which serve to control the operations of the selector bars 22 have been received, the selected card or cards are caused to move downward from the file of cards 4 and into engagement with the raised selector bars 22A, as shown in FIG. 6. Those cards in the file 4 which do not have all of the coded notches 20 in the lower edges thereof corresponding in position to the positions of the raised selector bars 22A will be accurately positioned and held in place at three points. Thus, the lower edges 12 of the non-selected cards will rest upon the upper edges of the raised selector bars 22A whereas the lower front corners 40 of the non-selected cards will abut the vertical front edge 71 of the card-retaining bar 44 below the inner inclined surface 42. At the same time, the upper rear corners 18 of the non-selected cards in the file 4 will be positioned by engagement with the front edge 34 of the card-engaging bar 36.

The means employed for moving the selected card or cards downward from the file of cards 4 can, of course, be varied depending upon the physical or other characteristics of the cards and the card-displacing means used. Thus, although magnetic, electrostatic, or other means may be employed to cause the selected card or cards to move down from the file of cards 4, the cards are preferably caused to descend by vibrating the entire file of cards in a direction transverse to the plane of the cards. In any event, the rear sweeper member 32 is first moved rearwardly from beneath the lower rear edges 16 of the cards as shown in FIG. 6, and the front card supporting member is lowered from the lower edges 12 of the cards. The vibrating devices 70 which are located near the ends of the raised selector bars 22A and contacted by the actuating bar 56 are then caused to vibrate. Since the actuating bar 56 is engaged by the right-hand ends of the raised selector bars 22A, as seen in FIGS. 7 and 8, all of the cards in the file 4 which rest upon the raised selector bars 22A will thereby be displaced back and forth a short distance transversely to cause the cards to be separated and shaken.

During the vibration of the raised selector bars 22A which the lower edges 12 of the cards engage, the selector bars are, in fact, moved in a somewhat inclined direction as indicated by the arrows 81 in FIGS. 3 and 7. Such movement is due to the fact that the curved configuration of the notch 68 on the selector bars engaging the cam plates 52 causes the selector bars to be raised and lowered somewhat when they are vibrated. As a result, the cards are caused to creep to the left, viewing the same as in FIG. 3, toward the divider 6 whereby they are held in a substantially vertical position. At the same time, the slight movement of the selector bars to the left as shown in FIGS. 3 and 7 serves to separate the unsupported selected card from the cards on opposite sides thereof. It is thus possible to overcome the frictional contact which might otherwise tend to prevent free movement of the selected card downward under the action of gravity. Thereafter, when the card supporting member 30 and the sweeper member 32 return, at the end of the card-selection and ejection cycle, to their starting positions shown in FIGS. 4 and 11, friction-producing surfaces 57 on card support 30 and sweep 32 prevent the cards from slippage to the right in FIG. 3 in a direction longitudinally of the support and sweep 32. Surfaces 57, as shown, are produced in the illustrated example by crossed score lines formed in the card-contacting portions of support 30 and sweep 32. In this way, surfaces 57 are roughened so as to frictionally engage the bottom edges of the cards against the mentioned slippage longitudinally of support 30 and sweep 32. This is desirable, when, for example, a substantial number of cards has been removed so that the remaining, unselected cards would not fill up the space between adjacent dividers and might hence tend to fall over to inclined positions more readily than they do when the surfaces 57 are provided. Such tendency toward slippage, when the machine is at rest between cycles, may manifest itself as a result of vibrations from adjacent machines, vehicular traffic in nearby streets etc.

When the file of cards is thus actuated, the selected card or cards which are not supported by the raised selector bars 22A will move downward and substantially vertically into the lowered position shown at 2A in FIG. 6. The front portion of the lower edge 12 of the selected card 2A, before it moves downward will then engage the upper edge of the front support member 30; whereas, the lower rear corner 16 of the selected card 2A when it moves downward will enter the notch 72 in the rear sweeper member 32.

The card or cards 2A thus selected and displaced from the file of cards 4 can be processed in any desired way to utilize or obtain the desired data or information therefrom or to add data or information thereto. Thus, for example, as shown in FIG. 11, the selected card 2A may be further removed or displaced from the file 4 to the position 2D. For this purpose, the front card support 30 may be raised to lift the lower front corner 40 of the selected card above the vertical edge 71 of the card-retaining bar 44 and above the lower end of the inwardly inclined edge 42 of the front card-retaining bar 44. At the same time, the selected card 2A is tilted with respect to the remaining cards in the file 4 so as to cause the upper rear corner 18 of the selected card to be moved rearward beneath the lower front corner of the card-engaging bar 36 at the upper rear edge of the file as shown in FIG. 9.

The raising of the front card support 30 to lift the lower front corner of the selected card will also serve to return the card support 30 to the position of FIG. 9 wherein it supports the lower front corners of all of both the selected and non-selected cards in the file 4. The selector bars which were raised to the selecting positions 22A of FIG. 9 are then lowered so that they no longer engage the selected card 2A. The selector bars are thus returned to their original idle positions as shown in FIG. 10 whereupon the latch means 58 are moved by springs 64 to engage the notches 62 in the left-hand ends of the selector bars 22 so as to hold said bars in their lowered idle positions 22B in readiness for a new cycle of operations.

With further regard to the stages of the card-selection and ejection cycle shown in FIGS. 9–11, and referring specifically to FIG. 10 wherein an unselected card is shown in dotted lines and a selected card is shown in tilted position in full lines, it will be understood that the unselected card is prevented from tilting by reason of the fact that its upper left hand corner (viewing the same as in FIG. 10) is engaged by bar 36.

After the selector bars have been lowered, the rear sweeper member 32 is moved forward, as shown in FIG. 11, so that the lower front corner 40 of the selected card 2A will ride up the inclined surface 42 of the card-retaining bar 44 and the selected card will be pushed forward in a substantially horizontal direction by the sweep member 32 and to the projected position 2D illustrated in FIG. 11. When thus projected, the selected card or cards can be removed manually from the file for utilization of the data or information thereon or they may be moved, removed or handled in any manual or automatic way desired.

Any suitable or preferred mechanism may be employed for actuating the front card support 30 and the sweeper member 32 and for returning the card-selecting bars 22 to their lowered idle positions preparatory to a renewed operation. As shown in FIGS. 12 to 15, these movements and the timing and sequence of operation of the various elements of the mechanism can be controlled by means of a shaft 80 driven by a motor 82 through the gear train 84 and clutch means 86, as shown in FIG. 15.

The upward movement of the front card support 30 can be effected by employing the elements illustrated in FIG. 12 which include a bar 88 longitudinally movable within the support member 30 and having one or more upwardly facing inclined surfaces 90 engageable with the pins 92 which extend transversely of the support member and are vertically movable within the slots 94 in stationary brackets 96. The longitudinal movement of bar 88 to raise the support member 30 is controlled by a link 98 connected to bar 88 at 100 and having its opposite end connected at 102 to the pivoted arm 104. The arm 104 is positioned to be engaged by the pin 106 carried by eccentric member 108 secured to the rotatable shaft 80.

The eccentric member 108 is rotatable in the direction indicated by the arrow 109 in FIG. 12 to cause pin 106 to move the upper end of the arm 104 to the right as indicated in dotted lines in FIG. 12. In this way, link 98 serves to move the bar 88 to the left so that pins 92 will ride up the inclined surfaces 90 on the bar 88 and cause the card-supporting member 30 to be raised.

A pivoted latch member 110 is mounted on the side frame 112 and has a latching element 114 thereon, which is urged downward by a spring 116 to engage a notch 118 in the link 98 to hold the link, and bar 88 in their lefthand positions whereby the card-supporting member 30 will be held in its raised idle position. Thereafter, a solenoid or other actuating means 120 connected to a bar 122 pivotally mounted at 124 is actuated to depress the end 126 of the pivoted bar 122. The latch member 110 then is engaged by the end 126 of the bar 122 so that latch element 114 will be raised from the notch 118 in the link 98. When this occurs, the link 98 and bar 88 are released to permit them to be moved to the right as seen in FIG. 12 under the action of spring 128. The card-supporting member 30 then moves downward to the position of FIG. 6 as the lower portions of the inclined surfaces 90 are presented to the pins 92 on the card-supporting member.

Figure 13:
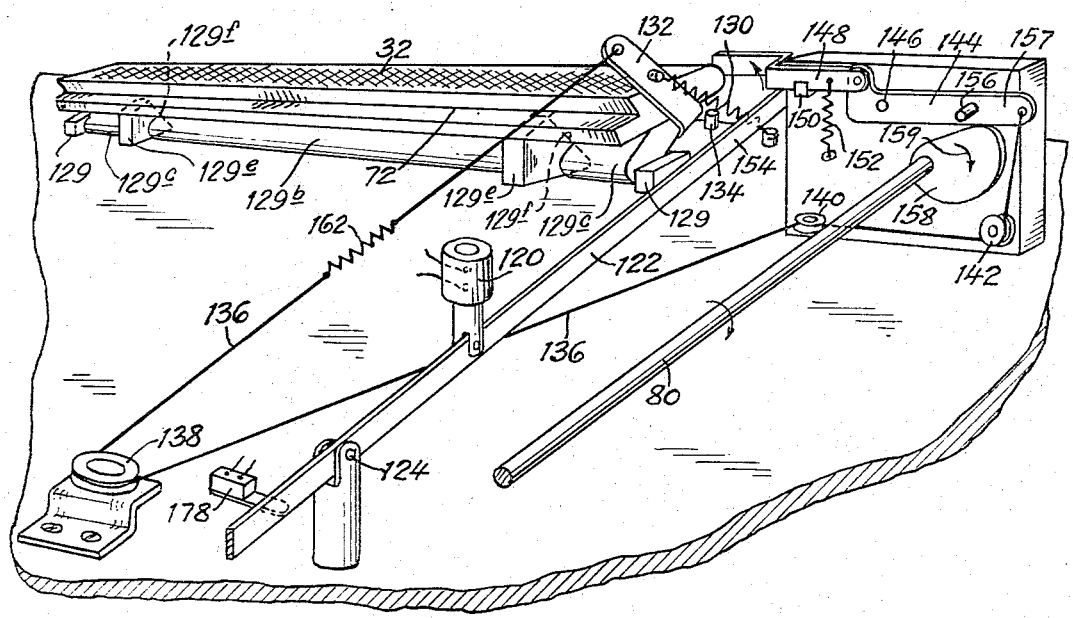
FIG. 13 is a fragmentary perspective view illustrating a further portion of mechanism of the character shown in FIG. 12.

Referring to FIGS. 4–6, 9–11, and to FIG. 13, a mounting for the sweep member 32 includes support brackets 129 between which a pivot rod 129a extends. The pivot rod extends through the lower edge portions of a series of aligned pivot plates 129b, 129c (FIG. 13). These plates are thus mounted for swinging movement between opposite extreme positions shown in FIGS. 9 and 11 respectively. The upper edge portions of plates 129b, 129c are pivotally connected, by a rod 129d, to the rear edge portion of the sweep member 32. Member 32 is thus movable between the opposite extreme positions shown in FIG. 9 and 11. Cam blocks 129e (FIG. 13) are interposed between pivot plate 129b and the plates 129c, and have sloped back surfaces 129f terminating in apex portions 129g. When the sweep 32 is in its FIG. 9 position, the forward edge portion thereof, as shown in FIG. 9, rests upon the sloped back surfaces 129f of cam blocks 129e. When the sweep member is moved to its forward, FIG. 11 position, it rides up upon the cam surfaces 129f, and moves into its horizontal, FIG. 11 position as an arcuate bottom recess 129h of the sweep member receives the apex portions 129g of the cam blocks.

The card-sweeping member 32 as shown in FIG. 13 is urged rearwardly toward a retracted position as illustrated in FIGS. 6, 9 and 10 by means of a spring 130 connected to an arm 132. Its movement under the action of spring 130 is limited by a stop member 134. When in the position of FIG. 6, the lower rear corner 16 of the selected card will move downward to enter the notch 72 in the card-sweeping member 32. Thereafter, the card-sweeping member is movable forward to the card-ejecting position of FIG. 11 (and the card-supporting position of FIGS. 4 and 5) by suitable mechanical, electrical or other means; but, as shown, a cable 136 is connected to arm 132 and passing about pulleys 138, 140 and 142. The opposite end of cable 136 is connected to one end of the arm 144 pivotally mounted at 146. The opposite end of the arm 144 is connected to a latch member 148 that is urged toward a latch stud 150 by a spring 152.

Latch member 148 extends, when held against stud 150 by spring 152, in a position in which it prevents movement of sweep member 32 from its forward, FIG. 11 position to its retracted, FIG. 9 position. Latch member 148 thus extends across bar 122, above end 154 of said bar. The arrangement is such that when end 154 is elevated, it shifts the latch member 148 upwardly against the restraint of spring 152, about the pivotal connection which the latch member 148 has to the arm 144. This upward movement of latch member 148 is effective to free the sweep member 32 for movement from its FIG. 11 to its FIG. 9 position.

The latch member 148 is movable upward to be disengaged from the latch stud 150 upon upward movement of the end 154 of the pivoted bar 122 when the latter bar is actuated by the solenoid 120 or other suitable electrical or mechanical means. Accordingly, the energizing of solenoid 120 and the movement of pivoted bar 122 which serves to release the latch member 110 of FIG. 12 to lower the end 126 thereof and allow the front card support 30 to be lowered, also serves to raise the opposite end 154 of the pivoted bar 122 to release the latch member 148 of FIG. 13 to permit movement of the sweep member 32 under the action of spring 130 to the retracted, selected card-engaging position of FIGS. 6, 9 and 10. Thereafter, rotation of the shaft 80 by motor 82 will cause the eccentric 158 of FIG. 13 to rotate in the direction indicated by the arrow 159 to engage the pin 156 on the arm 144 and cause the end 157 thereof to be raised. In this way, the cable 136 is pulled to move the arm 132 and the card-sweeping member 32 against the action of spring 130 to the file card-supporting position of FIGS. 4, 5 and 11. At the same time, the latch member 148 of FIG. 13 is returned to engage latch stud 150 so as to hold the card sweep member 32 in its idle position of FIGS. 4, 5 and 11 preparatory to the carrying out of another card-selecting and card-ejecting operation. The spring 162 in cable 136 is expanded upon relatching movement of latch member 148 since the card-sweeping member 32 will already have been moved to the limit of its forward, file card-supporting position.

Figure 14:
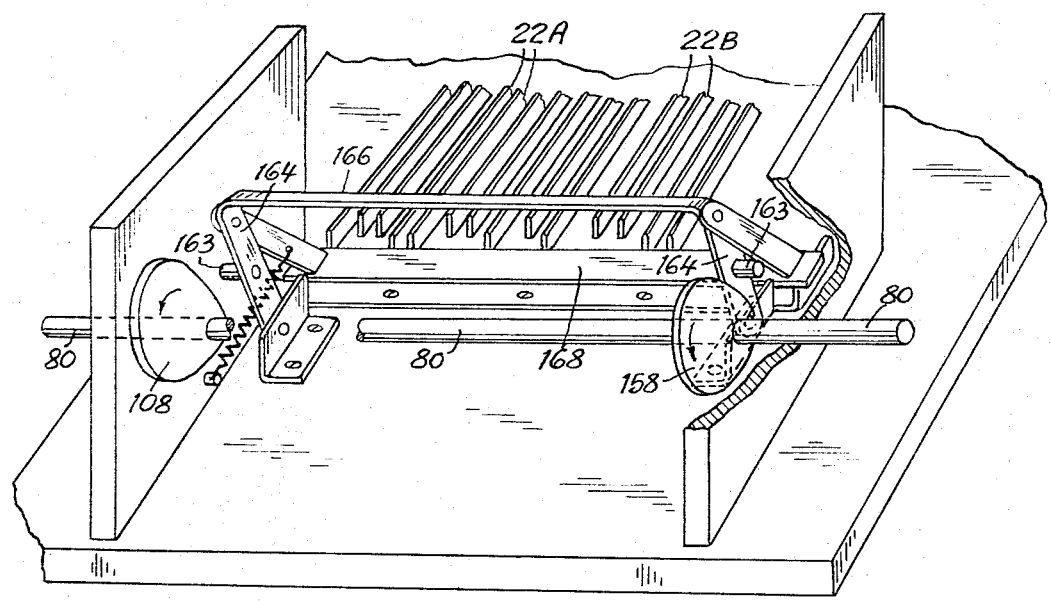
FIG. 14 is a fragmentary perspective view showing the relation of the portions of the mechanism illustrated in FIGS. 12 and 13 together with means for restoring the card-selecting members to a starting position.
Figure 15:
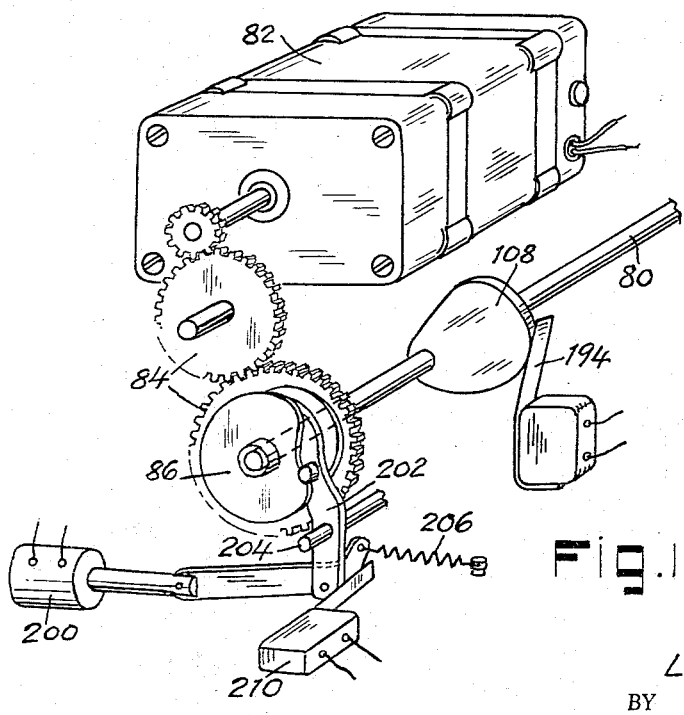
FIG. 15 is a fragmentary perspective view illustrating typical driving, timing and resetting means which may be employed in the equipment of FIGS. 1 to 14.

Further, as illustrated most clearly in FIG. 14, the rotation of shaft 80 causes the eccentrics 108 and 158 thereof to engage pins 163 on pivoted levers 164 which form the opposite ends of a bail or inverted U-shaped member 166. A selector bar-returning member 168 is carried by the member 166 so that as the shaft 80 is rotated further, the selector bar-returning member 168 is caused to push the raised selector bars 22A to the left as seen in FIGS. 7 and 8 to return them to their lowered and latched positions 22B as shown in FIGS. 4, 10 and 11. The card-selector bars, when thus returned to their lowered, idle position, are moved against the action of the relatively strong springs 54. The latches 58 then engage the notches 62 adjacent the opposite ends of the selector bars 22. The various elements of the mechanism are thereby returned to their initial positions and the cycle of operations is completed. Accordingly, the mechanism is then prepared for renewed operation in selecting and ejecting another selected card or group of cards.

The actuating means employed in combination with the mechanism described may be of any suitable or preferred type capable of effecting the proper sequence and timing of the movements of the elements and the return thereof to an initial or ready position for repeating the cycle of operations.

Figure 16:
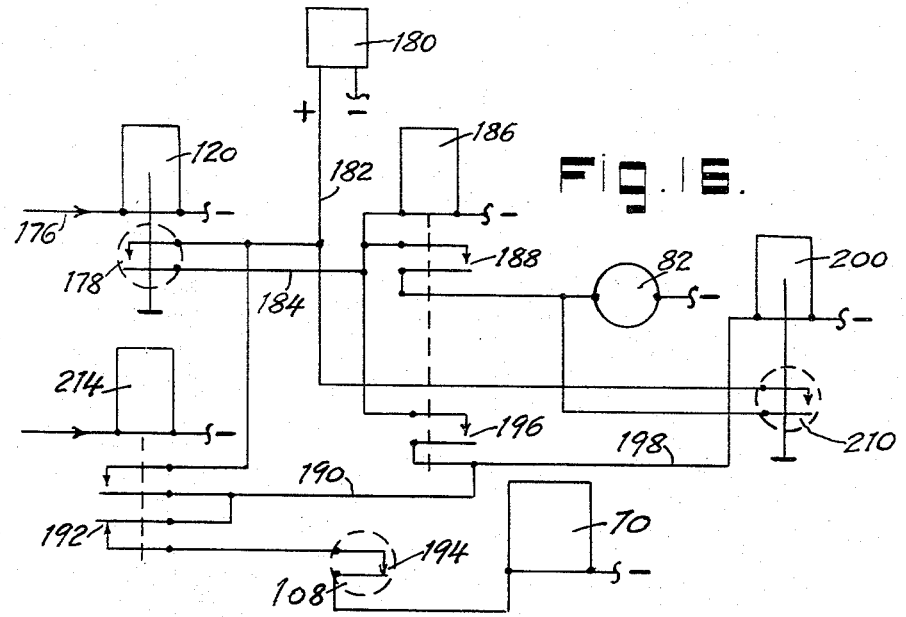
FIG. 16 is a wiring diagram illustrating a typical type of electrical circuitry which may be used in actuating various elements of equipment embodying the present invention.

Typical electrical and mechanical elements which may be employed for this purpose are illustrated in FIGS. 15 and 16 of the drawings. Thus, the signals or coded impulses received by the equipment or file 4 serve to actuate selected solenoids or other actuating means 66 associated with the selector bars 22 to cause those selector bars corresponding to the input signal to be raised to the positions 22A wherein the ends of the raised selector bars engage the actuating bar 56.

Upon completion of the input signal and preferably upon receipt of the final element of the signal, current is supplied through line 176 to solenoid 120 which actuates pivoted bar 122 to close the contact 178. In this way, a circuit is completed from the power source 180 through line 182, contact 178 of FIGS. 13 and 16, and line 184 to relay 186. The energizing of relay 186 serves to actuate switch 188 completing a circuit for driving the motor 82. The energizing of relay 186 also serves to complete a circuit through switch 196, line 190 and closed contact 192 to switch 194. The switch 194 is closed by cam 108 to actuate vibrating means or other device 70 for vibrating the actuating bar 56 and the raised card-selector bars 22A.

The energizing of relay 186 also serves to actuate switch 196 so that current will flow through the line 198 to energize the clutch release solenoid 200. In this way, the motor 82 is coupled through gear train 84 and clutch 86 to drive shaft 80 by which the mechanism of FIGS. 12, 13 and 14 are relatched and reset. When the clutch release solenoid 200 is energized, it causes the clutch release arm 202 to rock about its pivot 204 whereby the clutch 86 is actuated to drive the shaft 80 through one revolution. Upon completion of one revolution of shaft 80 and one complete cycle of operations, the clutch arm 202 is restored to its original position by the spring 206 and the mechanism is restored to its normal idle position for initiating a new or subsequent cycle of operations. During the operating cycle, the holding switch 210 remains in a closed position so as to continue the supply of current to the motor 82 even though the flow of current is cut off through line 176.

The input signal will serve to permit power source 180 to supply power to relay 186 and to clutch-actuating solenoid 200 to cause the motor 82 to be driven so as to cause shaft 80 to rotate. At the same time, the vibrating means 70 is actuated to cause the selected card in file 4 to move downward to the selected card position 2A. Thereafter, as eccentric member 108 on shaft 80 rotates, it will engage the switch 194 and hold it closed to complete the circuit to the vibrating means 70. The solenoid 120 will be de-energized upon conclusion of the input signal. However, the motor 82 will continue to receive current through the holding circuit established by clutch 202 and the switch 210. Accordingly, the motor will drive shaft 80 through a complete rotation and cycle of operations until the holding circuit is broken upon the opening of switch 210 by movement of the clutch arm 202.

The sequence of timing of the movements of the front card support 30 to raise the front edge of the selected card 2A above the inclined edge 42 of card-retaining bar 44 as well as the operation of the selector bar-returning member 168 and the raising of the rear card sweep 32 are, of course, controlled by the shape and position of the eccentric members 108 and 158 on shaft 80. Thereafter, at the conclusion of the cycle of operations, the movement of the clutch arm 202 will actuate switch 210 to break the motor-holding circuit and restore the system to its initial idle or ready condition.

In addition to the elements described above, the equipment is preferably provided with an error or correction means which, as shown in FIG. 16, includes a relay 214 arranged to respond to a special correction input signal, such as that which may result from operation of the correction key 28 on the signal device 24 of FIG. 1. The operation of correction relay 214 may take place at any time prior to the signal input to relay 120 and will serve to cause the selector slide-restoring member 168 to be actuated while the motor 82 and clutch 86 will complete their cycle of operations and return to their initial or starting positions.

The equipment illustrated in FIGS. 1 to 16 of the drawings and described above serves first to select a particular card or cards corresponding to the nature of the input signal and then serves further to move the selected card or cards to project positions in which they may be manually removed from the file. This arrangement is very satisfactory when the cards in the file 4 are in a random arrangement. However, in some instances, it may be desirable to maintain the cards in the file in an orderly or numerical arrangement. Under such circumstances, it is preferable to move the cards to positions wherein a portion of the card still remains in position between adjacent cards while the data or transparency-carrying portion of the card is exposed for reading or processing.

Figure 17:
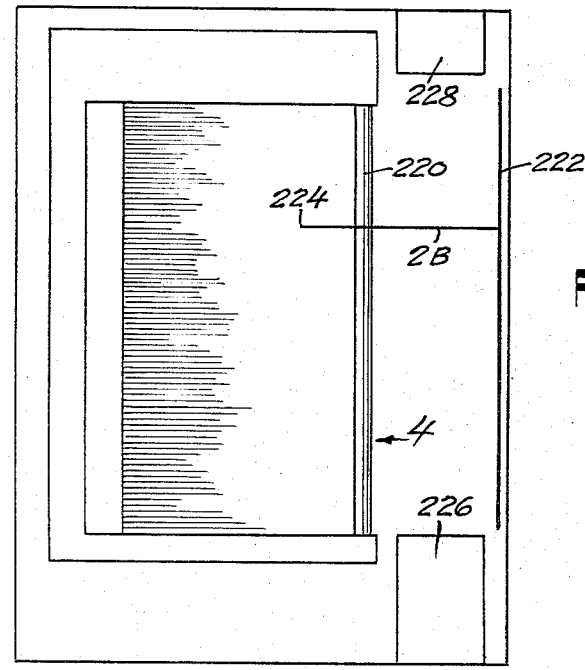
FIG. 17 is a diagrammatic plan view of a typical assembly which may be employed for selecting, reading, and returning a card stored in a file.
Figure 18:
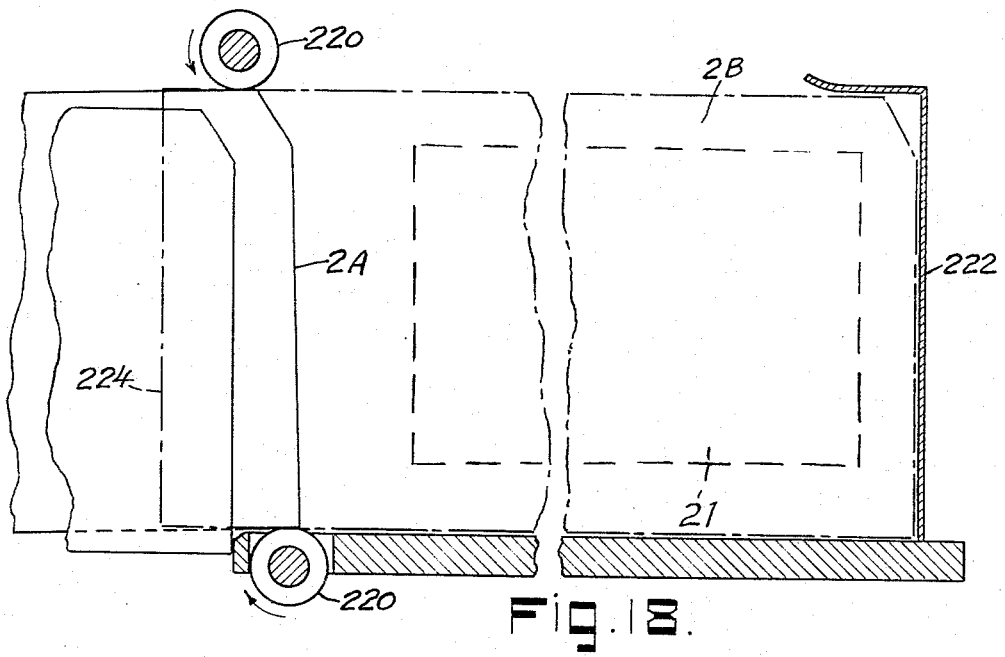
FIG. 18 is a transverse sectional view of a portion of the assembly illustrated in FIG. 17.

In that form of the present invention illustrated in FIGS. 17 and 18, the movement and reading of cards maintained in an orderly arrangement in a file is rendered possible. Thus, as shown in FIG. 17, supplemental card-engaging and moving means 220 are located adjacent the front of the file 4 in position to engage a card projected from the file by the card-sweeping member 22. Such means may conveniently be in the form of rubber rollers or the like which are rotatable to move a selected card to a card-reading position 2B as seen in FIG. 17. The major portion of the card including an element such as the transparency 21 is then exposed; whereas, its outward movement may be limited by a barrier 222 spaced from the front of the file 4.

When the selected card is then positioned, the inner end 224 of the card will remain in the file so that its position with respect to other cards in the file will remain unchanged. At the same time, the exposed portion of the card will be available for reading, as for example, by the projection of light from a source 226 through a transparent exposed portion of the card to a screen 228. After the card has thus been exposed and read, the card-moving and engaging means 220 may be rotated or moved in the opposite direction to return the selected card to its original position in the file 4. Of course, the construction of FIGS. 17 and 18 can also be used when the cards are in a random arrangement.

Further, when the cards in file 4 are in random arrangement, the cards may be removed from the file completely and carried or transferred to a processing device after which they can be returned to the end of the file for further or subsequent use.

Figure 19:
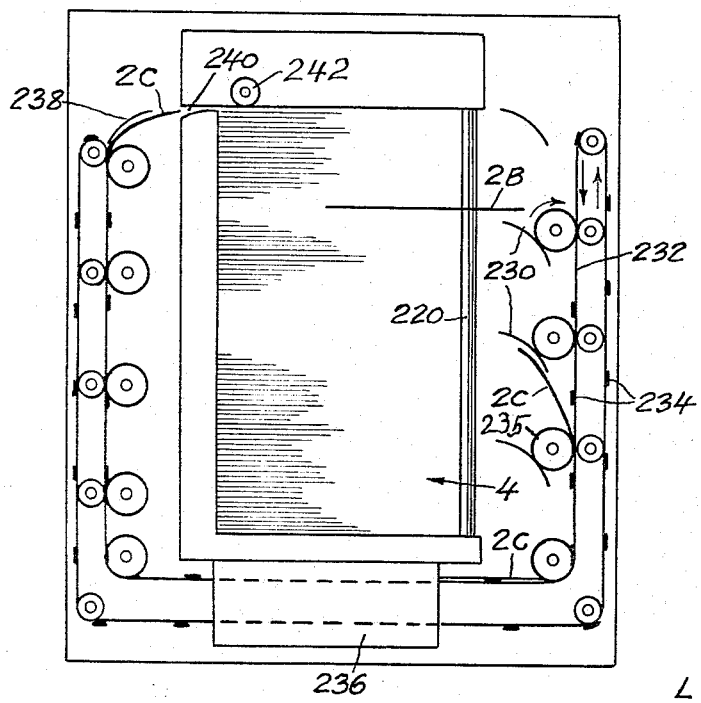
FIG. 19 is a diagrammatic plan view of an alternative form of card-handling and translating means embodying the present invention.

For this purpose, equipment of the type illustrated diagrammatically in FIG. 19 can be employed. As there shown, card-engaging and moving means 220 such as that shown in FIG. 17, can be positioned adjacent the front of the file 4. The cards moved outward from file 4 then can be caused to engage card-deflecting means 230 or the like which direct the cards into engagement and substantial parallelism with a card conveyor 232. The card conveyor preferably is in the form of a continuous belt which may have means thereon, such as clips or magnets 234 for receiving and holding a card moved outward from the file by means 220. However, by spacing the idler rolls 235 a distance apart which is substantially less than the length of the cards, each card will be held in engagement with the conveyor 232 throughout its movement in contact with the conveyor as indicated at 2C. The cards 2C thus received and transported by the conveyor 232 are then moved to a card-processing device 236 where they may be held or acted upon in any desired manner to read, utilize or add to the data or information carried by the card.

After the card 2C has been read, the conveyor 232 serves to advance to the cards 2C further until they are presented to card-returning means such as a deflector 238 which directs the card in to an opening 240 in the rear of the file to a roller 242, or other means which serves to return the cards 2C to the file 4 in any other way.

The equipment thus provided is capable of wide usage and variation to meet conditions which may vary greatly. Moreover, as shown in FIG. 1, it will be apparent that the front and top of the file 4 may be left open so as to permit ready access to the cards in the file for manual handling or the insertion, removal or inspection of the cards at any time and without interfering with the operation of the equipment.

Furthermore, it will be apparent that any desired coding or impulse means may be used to effect the selection of a particular card or cards in the file. Thus, the elements on the cards by which the signals or coded impulses are utilized may embody or include elements other than the notches 20 in the lower edge of the card and they may also or alternatively be located on both horizontal edges of the card, if desired. When both the upper and lower edges of the cards carry coded elements, it will generally be desirable to identify the ends of the cards so that all cards may be arranged in the file with the same type of coding elements facing downwardly. For this purpose, the rear vertical edges 14 of the cards may be suitably marked as by providing a single centrally located notch 250 therein whereas the opposite end 8 of each card may be provided with one or more notches 252 which are otherwise located in a contrasting manner. Accordingly, if desired, the cards can be processed as desired for one purpose in response to a code present on the edge 10 thereof and can be alternatively or additionally sorted or processed by means of coded elements along the edge 12 of each card.

The cards themselves may carry information or data in the form of punched holes, magnetic or conducting means, transparencies or any other type of memory or information-storage means. The coding means of the present invention thus leaves the body or central portion of the card free to receive any desired type of data and to permit processing of the cards by any of the usual or conventional equipment ordinarily employed in data processing equipment.

The specific design of the method or mechanism by which selected cards are moved and presented for removal can be varied to suit particular circumstances. For example, should it be desirable to move a selected card largely upward, instead of both horizontally and upward as previously described, an alternate mechanism and method can be employed as illustrated in FIGS. 20, 21, 22, 23, 24 and 25.

As shown in FIG. 20, the mechanism may embody a front card-supporting member 30 and a rear card-supporting member 260 which is similar in construction and operation to the card-supporting member 30. Thus, both the front support member 30 and the rear support member 260 are movable vertically in predetermined sequence or timed relation. Accordingly, when the cards 2 are placed in the file 4, they initially rest on the front support 30 and the rear support 260 as shown in FIG. 20. The lower edges 12 of the cards then extend horizontally in the file 4 and are spaced a short distance above the selector bars 22. The vertical rear edges 14 of the cards are then positioned in substantial alignment with each other and the upper rear corners 18 of the cards are adjacent the front surface 34 of the card engaging bar 36 located at the rear and above the file. The lower front corners 40 of the cards 2 in the file 4 are also positioned in alignment with each other and adjacent to the vertical face 262 of the front card-retaining bar 264. This is the normal position of all the cards in the file when the equipment is at rest.

When it is desired to select a particular card or cards from the file 4, at least one, and generally several, of the selecting bars 22 are raised as previously described, from the lowered idle position of FIG. 20 to the raised selecting position of FIG. 21, wherein the selected bars 22A project above the lowered and idle selecting bars 22B, but still are beneath and preferably spaced from the lower edges 12 of the cards in file 4.

When all of the selector bars 22A have been raised in accordance with signals or other impulses impressed on the selector bar actuating solenoids shown in FIG. 7, the cards and selector bars will be arranged as shown in FIG. 21. Thereafter, the front support member 30 and the rear support member 260 are both caused to move downward from beneath the cards in file 4 to a position below the raised selector bars 22A. In this way, all the cards in the file 4 will be lowered to rest on the raised selector bars 22A. At this point in the cycle of operation, the selected card or cards, whose code notches align with raised selector bars 22A, are caused to move downward from the file of cards 4 and into engagement with the raised selector bars 22A as shown in FIG. 22. Such downward movement of the selected cards may be effected by vibration or other motivating means whereby they are caused to assume the position indicated at 2A in FIG. 22. Thus, those non-selected cards in the file 4 which do not have all of their code notches 20 in their lower edges 12 corresponding in position to the positions of the raised selector bars 22A, will be accurately positioned and held in place at three points. Thus, the lower edges 12 of the nonselected cards will rest upon the upper edges of the raised selector bars 22A, whereas the lower front corners 40 of the nonselected cards will abut the vertical front edge 262 of the card-retaining bar 264. At the same time, the upper rear corners 18 of the nonselected cards in the file 4 will be positioned by engagement with the front vertical edge 34 of the card engaging bar 36. However, as shown in FIG. 22, the upper rear corners 18 of the selected cards 2A will be lowered so as to be positioned below the front vertical edge 34 of the card engaging bar 36 at the upper rear portion of the card file. As a result, the selected card or cards 2A are movable rearwardly beneath the card engaging bar 36.

In order to move the selected card or cards 2A for access and removal from above the file of nonselected cards, the front support 30 may be raised vertically to its original idle position as shown in FIG. 23. In this way, the lower front corner 40 of the selected card is moved upward as guided by the vertical surface 262 of card-retaining bar 264. This upward movement of the front end of the selected card or cards will tilt the cards 2A with respect to the remaining cards in the file 4. As a result, the upper rear corner 18 of the selected card will be moved rearwardly beneath the lower horizontal surface 266 of the card engaging bar 36 at the upper rear edge of the file as shown in FIG. 23. The raising of the front card support 30 to lift the lower front corner 40 of the selected card 2A will also serve to return the front support 30 to the position of FIG. 23, 20 and 21 wherein it supports the lower front edge of all of both the selected and nonselected cards in the file 4.

Following the raising of front support member 30 and the tilting of the selected cards 2A, the selector bars 22A can be returned to their original idle positions 22B by motions and mechanisms such as previously described. Simultaneously with the resetting of the selector bars, the rear support member 260 is raised vertically to its original idle position as shown in FIG. 24. In this way, the rear portion of the selected card or cards will be raised. However, the upper rear corner 18 of the selected card will then engage the lower horizontal surface 266 of the card engaging bar 36. Since the rear card-supporting member 260 is positioned some distance in front of the rear edge 14 of the cards, the upward movement of the rear support member 260 will cause the selected card 2A to be further tilted about the member 260 as a fulcrum as shown in FIG. 24. The front top corner 268 of the selected card will then move upward to the position 2E of FIG. 24 so that it will project a substantial distance above the nonselected cards. As a result, the selected card 2E will be presented in a manner permitting easy manual removal thereof from the file 4. The raising of the rear support 260 to move the selected card upward will also serve to reposition said rear support to the idle or beginning position as shown in FIGS. 24, 20 and 21, wherein it supports the lower rear edge of all of both the selected and nonselected cards in the file 4.

The mechanism and operation of the forward card support member 30 has been previously described and illustrated in FIG. 12. The mechanism of the rear card support member 260 preferably is similar to that of the forward support 30 and may be constructed as shown in FIG. 25. Accordingly, the upward movement of the rear support 260 is effected by a bar 88' longitudinally movable within the rear support member 260 and having one or more inclined surfaces 90' engageable with the pins 92' which extend transversely of the support member and are vertically movable within the slots 94' in stationary brackets 96'. The longitudinal movement of the bar 88' to raise the rear support member 260 is controlled by a link 270 connected to bar 88' at 272 and having its opposite end connected at 274 to the pivoted arm 276. The arm 276 is positioned to be engaged by the pin 278 carried by eccentric member 158 secured to the rotatable shaft 80.

The eccentric member 158 is rotatable in the direction indicated by the arrow 159 in FIG. 25 to cause pin 278 to move the upper end of the arm 276 to the left as indicated in dotted lines in FIG. 25. In this way, link 270 serves to move the bar 88' to the right so that pins 92' will ride up the inclined surfaces 90' on the bar 88' and cause the rear support member 260 to be raised.

A pivoted latch member 280 is mounted on the side frame 282 and has a latching element 284 thereon, which is urged upward by a spring 286 to engage a notch 288 in the link 270 to hold the link, and the bar 88' in their right-hand positions. In this way, the rear support member 260 may be held in its raised idle position. Thereafter, the solenoid or other actuating means 120 connected to a bar 122 pivotally mounted at 124 is actuated to move the end 154 of the pivoted bar 122 upwards. The latch member 280 engaged by the end 154 of the bar 122 then will be moved and will cause the latching element 284 to be lowered from the notch 288 in the link 270. When this occurs, the link 270 and the bar 88' are released to permit them to be moved to the left as seen in FIG. 25 under the action of spring 128. The rear support member 260 then moves downward to the position of FIG. 22 as the lower portions of the inclined surfaces 90' are presented to the pins 92' on the rear card-supporting member 260.

The remaining parts and mechanism of such an alternative construction may be similar or identical to those previously described in connection with FIGS. 1 to 18. The timing or sequence of the raising the front support member 30 and the rear support member 260 can, of course, be effected by suitable design and configuration of operating cams 108 and 158. These cams are accordingly positioned on shaft 80 so that one revolution of cam 108 will cause the front support member 30 to raise first and be latched in its upward position. Thereafter, cam 158 will cause the rear support member 260 to be raised and be latched in its upward position as previously described.

The form and construction of the card-selecting means employed and the manner in which they are moved in response to an input signal or impulse may be varied greatly. Thus, it is not necessary to use a binary code system and, in fact, the cards and card-selecting means may be constructed and arranged to respond to any desired coding system or signal. The card-selecting means themselves may be of different width, shapes or sizes depending upon the nature of the signal employed and the character, spacing or arrangement of the coded elements located on or adjacent the edges of the cards.

In a similar way, the card-selecting and moving means and the elements employed for actuating and timing or maintaining the sequences of the various operations or movements of the elements or devices used in the equipment are capable of wide variations.

In view thereof, it should be understood that the particular embodiments of the invention shown in the drawings and described above are intended to be illustrative only and are not intended to limit the scope of the invention.

I claim:

1. Information storage and retrieval equipment comprising:
   (a) a file of cards disposed in substantially vertical planes and having normally registering front, rear, and bottom edges, said bottom edges being coded;
   (b) selector means operable from retracted to operating positions adjacent said bottom edges in response to a coded impulse for allowing wanted cards to drop below unwanted cards, said selector means, when in the operating positions thereof, displacing correspondingly coded wanted cards from the remaining cards of said file;
   (c) ejector means movable from a retracted to an operating position along a path across which the displaced, wanted cards extend to shift the same to an access position; and
   (d) card position control means including
      (1) a card support extending below the several cards adjacent the front edges of the cards and movable vertically upwardly from a retracted to an operating position into supporting relation thereto,
      (2) an upper control member extending along the upper portions of the rear edges of the cards, said upper control member extending below the top edges of the undisplaced cards a distance less than the wanted cards are displaced so that the upper edges of the displaced cards are below said upper control member, said upper control member limiting the unwanted cards against movement upon said support into the path of the ejector means, and
      (3) a lower control member extending along the lower portions of the front edges of the cards and limiting the unwanted cards against movement away from the upper control member, said selector means, ejector means, and card support being mounted to operate in a predetermined sequence in which, with the ejector means and the card support in their operating positions, the selector means first responds to said coded impulse, the ejector means and card support are retracted to free the wanted cards for displacement from the unwanted cards, the card support is moved to operating position with the selector means retracted to tilt the wanted cards into said path of the ejector means, and the ejector means is moved from retracted to operating position to shift the wanted cards to the access position thereof, said wanted cards when in their tilted positions being disposed with their upper rear corners below and fully disengaged from the upper control bar to free the wanted cards for movement to said access positions thereof.

2. Information storage and retrieval equipment as in claim 1 wherein said ejector means and card support are disposed in said operating positions thereof in supporting relation to all the cards of the file between cycles of operation of the equipment.

3. Information storage and retrieval equipment as in claim 2 in which the selector means comprises a series of selector bars underlying the several cards normally to the vertical planes thereof.

4. Information storage and retrieval equipment as in claim 3 wherein the coding of said bottom edges comprises notches opening toward the bars to receive the same when the bars are in operating position with the ejector means and card support retracted.

5. Information storage and retrieval equipment as in claim 4 wherein the upper and lower control members comprise control bars mounted to remain stationary throughout the operating cycle of the equipment and extending in parallel relation to the selector bars.

6. Information storage and retrieval equipment as in claim 5 wherein said ejector means moves vertically upwardly from its retracted to its operating position to move the upper rear corners of the wanted cards into pivotal engagement with the upper control bar, said wanted cards pivoting on the upper control bar to their access positions.

7. Information storage and retrieval equipment as in claim 6 wherein the ejector means and card support include elongated bars extending in parallel relation to said control bars below the lower rear and front corners, respectively, of the several cards, said ejector means and card support having card-engaging top edges disposed in coplanar relation in said retracted and operating positions, respectively, of the ejector means and card support.

8. Information storage and retrieval equipment as in claim 5 wherein said lower control bar has a guide surface on which the wanted cards slide when shifted to their access position, said ejector means pivoting in a generally horizontal direction when moved to its operating position to shift the wanted cards onto said guide surface.

9. Information storage and retrieval equipment as in claim 8 wherein said card support includes an elongated bar extending in parallel relation to said control bars adjacent the lower rear and front corners, respectively, of the several cards, the bar of the ejector means being mounted to swing in an arc to its operating position and having a top surface supporting the several cards in said operating position of the ejector means, the bar of the card support having a card-supporting top edge coplanar with said top surface of the ejector means bar in the operating positions of the ejector means and card support.

References Cited by the Examiner

UNITED STATES PATENTS

| 2,395,924 | 3/1946 | Wade | 129—16.1 |
| 2,524,918 | 10/1950 | McKeown | 129—16.1 |
| 2,602,451 | 7/1952 | Hofgaard | 129—16.1 |
| 2,665,694 | 1/1954 | Mooers et al. | 129—16.1 |
| 3,092,114 | 6/1963 | Jonkers | 129—16.1 |
| 3,105,593 | 10/1963 | Fredkin | 129—16.1 X |

FOREIGN PATENTS

| 829,953 | 5/1938 | France. |
| 1,000,931 | 10/1951 | France. |
| 307,432 | 1/1930 | Great Britain. |

JEROME SCHNALL, *Primary Examiner.*